US012611841B2

(12) United States Patent
Bajaj et al.

(10) Patent No.: US 12,611,841 B2
(45) Date of Patent: Apr. 28, 2026

(54) METHOD FOR PRODUCING REGENERATED CELLULOSE-BASED THREADS AND FELTED CLOTHS

(71) Applicant: Refiberd, Inc., Cupertino, CA (US)

(72) Inventors: Sarika Bajaj, Cupertino, CA (US); Tushita Gupta, Dublin, CA (US); Mingyue Wang, Pittsburgh, PA (US)

(73) Assignee: Refiberd, Inc., Cupertino, CA (US)

( * ) Notice: Subject to any disclaimer, the term of this patent is extended or adjusted under 35 U.S.C. 154(b) by 282 days.

(21) Appl. No.: 18/250,734

(22) PCT Filed: Nov. 2, 2021

(86) PCT No.: PCT/US2021/057790
§ 371 (c)(1),
(2) Date: Apr. 26, 2023

(87) PCT Pub. No.: WO2022/098680
PCT Pub. Date: May 12, 2022

(65) Prior Publication Data
US 2023/0391045 A1      Dec. 7, 2023

Related U.S. Application Data

(60) Provisional application No. 63/109,118, filed on Nov. 3, 2020.

(51) Int. Cl.
*B32B 5/02* (2006.01)
*B32B 5/26* (2006.01)
*D21H 13/08* (2006.01)

(52) U.S. Cl.
CPC .................. *B32B 5/02* (2013.01); *B32B 5/26* (2013.01); *D21H 13/08* (2013.01)

(58) Field of Classification Search
CPC ... B32B 5/02; B32B 5/26; C08B 16/00; C08J 11/16; C08J 2301/00; D01D 1/02; D01D 5/06; D01F 2/00; D01F 2/02; D01F 2/24; D21H 13/08
See application file for complete search history.

(56) References Cited

U.S. PATENT DOCUMENTS

| | | | | |
|---|---|---|---|---|
| 4,357,467 A | * | 11/1982 | Sachetto | C08B 15/02 514/960 |
| 5,880,278 A | | 3/1999 | Huston et al. | |
| 6,123,887 A | * | 9/2000 | Huston | C08J 5/18 264/177.11 |
| 6,527,997 B1 | * | 3/2003 | Meraldi | D01F 2/28 264/211.14 |
| 6,541,627 B1 | | 4/2003 | Ono et al. | |
| 8,962,821 B2 | | 2/2015 | Zhang et al. | |
| 10,611,891 B2 | | 4/2020 | Hu et al. | |
| 2017/0152199 A1 | | 6/2017 | Feghali et al. | |
| 2018/0334630 A1 | * | 11/2018 | Scalzo | C10L 5/442 |
| 2020/0199257 A1 | | 6/2020 | Liu et al. | |

OTHER PUBLICATIONS

International Search Report dated Feb. 2, 2022 cited in PCT/2021/057790, 2 pages.
European Search Report dated Jan. 28, 2025, cited in EP Application No. 21889934.2, 2 pages.
Liu, Wangcheng et al.: "Eco-friendly post-consumer cotton waste recycling for regenerated cellulose fibers", Carbohydrate Polymers, Applied Science Publishers, Ltd Barking, GB, vol. 206, Oct. 2018, pp. 141-148.

* cited by examiner

*Primary Examiner* — Philip C Tucker
*Assistant Examiner* — Jimmy R Smith, Jr.
(74) *Attorney, Agent, or Firm* — Pillsbury Winthrop Shaw Pittman LLP

(57)      ABSTRACT

The present invention is directed to efficient methods for producing contiguous threads or felted cloths from recycled cellulose-based waste. The contiguous thread produced is suitable to be sowed on a cloth; it is small enough to go through the pore of a needle, it is strong enough to hold together, and it is bendable and not disintegrated into fragments. The contiguous thread and felted cloth made by the present invention maintain their original dye color of the recycled cellulose waste, and they do not need to be re-dyed.

8 Claims, 5 Drawing Sheets

METHOD FOR PRODUCING REGENERATED CELLULOSE-BASED THREADS AND FELTED CLOTHS

This application is a national stage of International Application PCT/US2021/057790, filed Nov. 2, 2021, which claims the priority of U.S. Provisional Application No. 63/109,118, filed Nov. 3, 2020. The contents of the above-identified applications are incorporated herein by reference in their entireties.

FIELD OF THE INVENTION

The present invention relates to a method for producing regenerated cellulose-based contiguous threads and felted cloth from recycled cellulose waste.

BACKGROUND OF THE INVENTION

Cellulose is the most abundant renewable resource on the earth that is environmentally friendly. Sufficient utilization of cellulose can protect the environment and save limited unrenewable petroleum resources. However, cellulose is not sufficiently utilized in chemical industry, mainly because the current processes for recycling cellulose waste are complex, costly, and tend to cause pollution.

Cotton is a material that is primarily made of cellulose. Cotton is widely used in consumer products such as garments and textiles. Consumption of such cotton products has been growing steadily in the past several decades. With increased consumption, cotton waste generation rises. Cotton waste can be categorized into pre-consumer or post-consumer waste. Pre-consumer waste is generated during production of yarns, fabrics, and end products; while post-consumer waste is generated when cotton products are discarded after use. Pre-consumer waste typically can be reclaimed for lower grade yarns and nonwoven products for automotive, building insulation, furnishings, etc. However, post-consumer waste is difficult to recycle using existing reclaiming techniques due to impurities left on the cotton products and/or wear and tear during use. A majority of post-consumer waste ends up in landfills or is incinerated. Landfilling or incinerating post-consumer waste produces a large amount of greenhouse gases and/or toxic chemicals/odors.

There is a need for processes that produce threads or felted cloth from regenerated cellulose waste to save environmental resources.

DEFINITIONS

"Cellulose" is an organic compound with the formula $(C_6H_{10}O_5)n$, a polysaccharide consisting of a linear chain of several hundred to many thousands of $\beta(1 \rightarrow 4)$ linked D-glucose units.

"Felting" is a process that causes fibers to fuse to the other fibers around them, to interlock with each other, and to create a dense, flat, matted fabric appearance.

"Fibers" refer to the smallest unit and the resultant after the textiles are ground up. Fibers are spun or connected to make "threads". Threads are woven or knit together to make "textiles"; textiles could range from a sheet of cloth to a finished shirt or pants.

Figure 1:
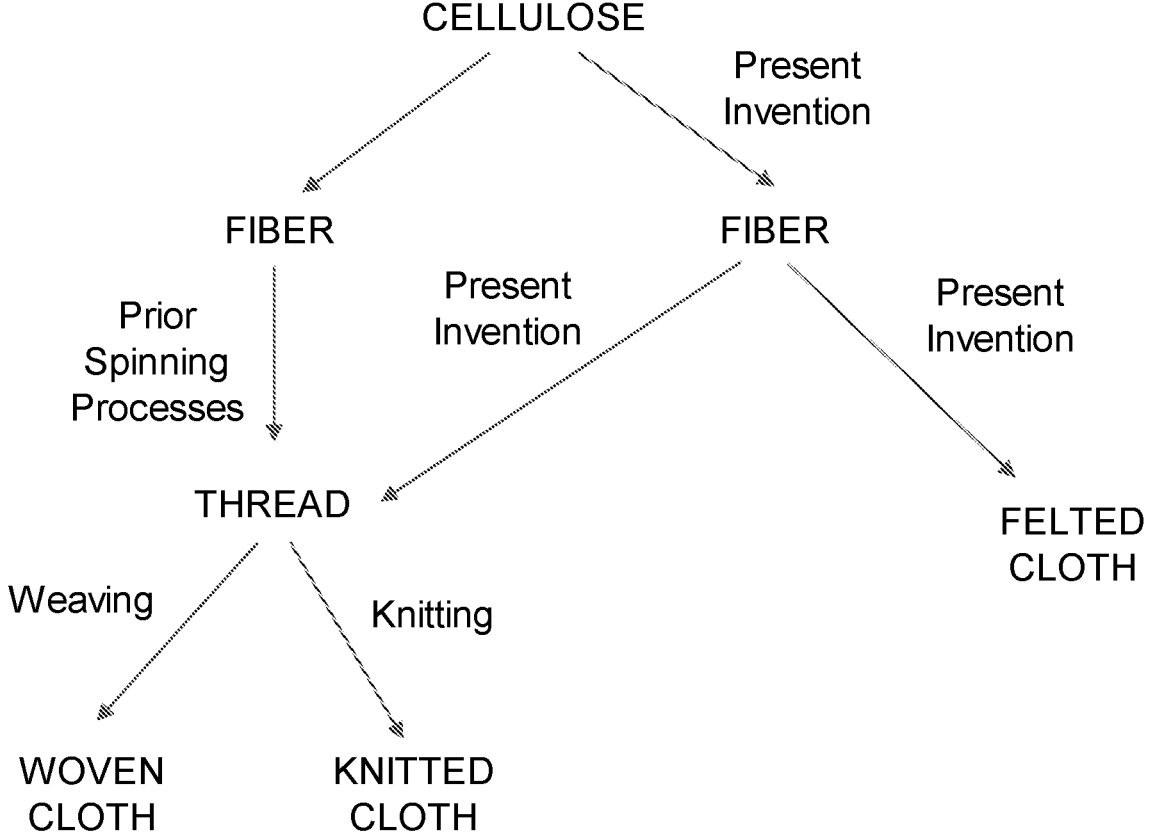
FIG. 1 shows a flow chart of different processes for preparing cloths from cellulose.

FIG. 1 shows a flow chart of different processes for preparing threads or cloths from cellulose.

The present invention provides methods for producing threads and felted cloth from recycled cellulose waste. The starting recycled cellulose-based textile materials include textiles consisting of materials that contain a high percentage of cellulose, such as textiles spun from cotton, rayon, flax, jute, hemp, etc., and regenerated textiles made from wood chips, leaves, etc. which includes Lyocell, modal, and plant-based textiles. The starting cellulose-based textile materials could also include a mixture of different materials that contain a high percentage of cellulose—even directly from leaves, unspun cotton, etc. For example, the cellulose-based textile materials can be 100% cotton, or a mixture of different cellulose-based materials such as cotton, rayon and hemp. The starting textile materials can be any usage state and any amount of wear, regardless whether they are torn or faded. The color and color fastness of the starting textile materials determine the final color of the regenerated thread or felted cloth.

Method for Preparing Contiguous Threads

In the first aspect, the present invention provides a method for producing regenerated cellulose-based contiguous threads. The method comprises the steps of: (a) grinding cellulose-based textile materials into first fibers having length less than 1 cm, (b) depolymerizing the first fibers in an acidic solution of pH 1-4 in a pressurized and heated chamber at 50-150° C. and 10-20 psi (pounds per square inch), (c) removing the acidic solution from the depolymerized fibers and drying the depolymerized fibers, (d) dissolving the dried and depolymerized fibers of (c) into an aqueous alkali solution containing 6-20% by weight of an alkali through mechanical agitation, at temperature between −8 to −30° C. to make a gelled cellulose solution, (e) degassing the gelled cellulose solution under vacuum, and (f) extruding the gelled cellulose solution 0.25-1 mm pore size into an acidic solution of pH 1-4 to polymerize the cellulose into second fibers and connecting the second fibers into a contiguous thread.

In step (a) of the process, the starting cellulose-based textile materials are optionally cut into pieces that are smaller than 1 cm². Then the pieces are further ground (e.g., using an electric grinder), which results in fiber segments shorter than 1 cm or 0.5 cm.

The small fiber segments are optionally immersed in a heated alkali bath, with a preferred pH of 11-13 and a preferred temperature range of 60-120° C., before step (b).

In step (b), the small fiber segments are submerged in an acidic solution of pH 1-4, preferably pH 1-3. For example, sulfuric acid, hydrochloric acid, nitric acid, and other strong acids are suitable for this step. The acidic fiber solution is kept in a pressurized and heated chamber to hydrolyze and depolymerize the fibers. The temperature is in general 50-150° C., and preferably 60-130° C. or 100-130° C. The pressure is in general 10-20 psi, and preferably 10-16 psi or 10-15 psi. The heating and pressuring time is in general 10 minutes to 6 hours, preferably 30 minutes to 6 hours, 1 to 6 hours, or 2 to 4 hours. Higher temperature and higher pressure decrease the time required for depolymerization. After being removed from the pressurized and heated chamber, the fibers are optionally kept in a heated, diluted strong acid solution, with a preferred pH range of 1-3 and preferred temperature range of 40-75° C.

In step (c), the depolymerized fibers are collected and optionally rinsed with water until the fibers reach a neutral pH of about 6-8. The fibers are then dried.

In step (d), the depolymerized fibers are dissolved into an aqueous alkali solution containing 6-20% by weight of an alkali through mechanical agitation, at temperature between −8 to −30° C., to make a gelled cellulose solution.

An alkali is a compound such as NaOH or KOH that forms hydroxide ions (OH⁻) when dissolved in water. In one preferred embodiment, the alkali solution further contains urea. For example, the alkali solution contains 6-10% (w/w) alkali and 10-20% (w/w) urea.

The fibers are dissolved in a low temperature between −8° C. to −30° C. to form a cellulose solution. The dissolution time is typically between 5 minutes to 2 hours, or 10 minutes to 1 hour. The low temperature makes the fibers dissolve consistently and stay stable for an extended period of time. The low temperature also results in a higher viscosity of the final thread, which lends itself better to a possible 3D printing in a later coagulation solution. A preferred temperature for dissolving the fibers to form a cellulose solution is ≤−16° C., and more preferably ≤−17° C.; for example, −17 to −30° C., −17 to −25° C., or −17 to −20° C. At a higher temperature of −8 to −15° C., ice has not formed in the inside of the NaOH/Urea solution, and the solution may warm up too fast with the mechanical agitation, which causes the fibers to dissolve less consistently into a gelled cellulose solution.

In step (e), the gelled cellulose solution is degassed under vacuum to remove air bubbles from the gelled cellulose solution. In one embodiment, the alkali cellulose solution is degassed using a vacuum system with a preferred pressure range of 25 inHg-35 inHg, at a preferred temperature range of 10-30° C. In one embodiment, the degassing is repeated, for example, once, twice, three times, or four times, which condenses and stabilizes the solution for coagulation and extrusion.

This degassing step is important, as it makes the cellulose solution coagulate easier and extrude into one continuous thread (the next step (f)) instead of producing a fiber that is spun together.

After degassing, the cellulose solution is optionally frozen at a preferred temperature range of −20 to −16° C., followed by storing at a preferred range of −5 to 5° C.

In step (f), the cellulose solution is extruded through 0.25-1 mm pore size into an acidic solution of pH 1-4 (a coagulation bath) to polymerize the cellulose into fibers and connecting the fibers into a contiguous thread.

In one embodiment, the cellulose solution is extruded through a syringe having 0.25-1 mm pore size.

In one embodiment, the cellulose solution is extruded through a membrane having 0.25-1 mm pore size.

In one embodiment, the cellulose solution is extruded into a coagulation bath having pH 1-3, at a temperature between 10-30° C. For example, the cellulose is extruded into 2-15% acetic acid or a vinegar bath to form a continuous thread.

It is important to extrude the cellulose solution into an acid bath so that the fibers will line up and stick together in the acid batch to form a contiguous thread, and not a small segment of thread.

Figure 2:
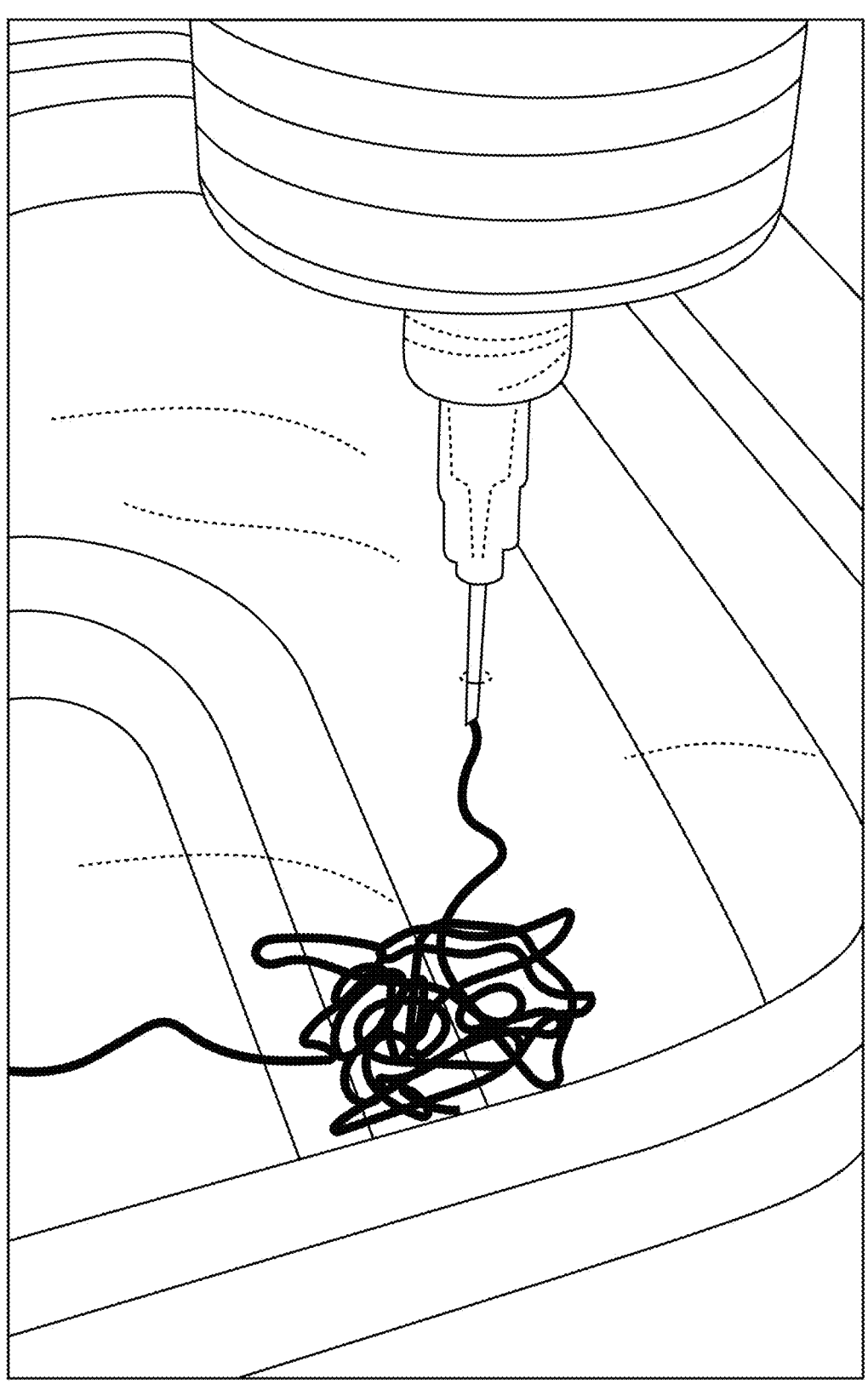
FIG. 2 is a picture showing a gelled cellulose solution extruded through a syringe into an acidic coagulation bath to polymerize the cellulose into fibers and connecting the fibers into a contiguous thread.

FIG. 2 is a picture showing extruding the gelled cellulose solution through a syringe into an acidic coagulation bath to polymerize the cellulose into fibers and connecting the second fibers into a contiguous thread.

The thread can be used for 3D printing within the coagulation bath, in which case the shape is printed in the coagulation bath and is rinsed and dried after the shape is created.

Optionally, the thread of step (f) is rinsed in water. The rinsed threads are optionally further dried, e.g., overnight. The dried threads can be used as new threads for sewing, weaving, etc.

Figure 3:
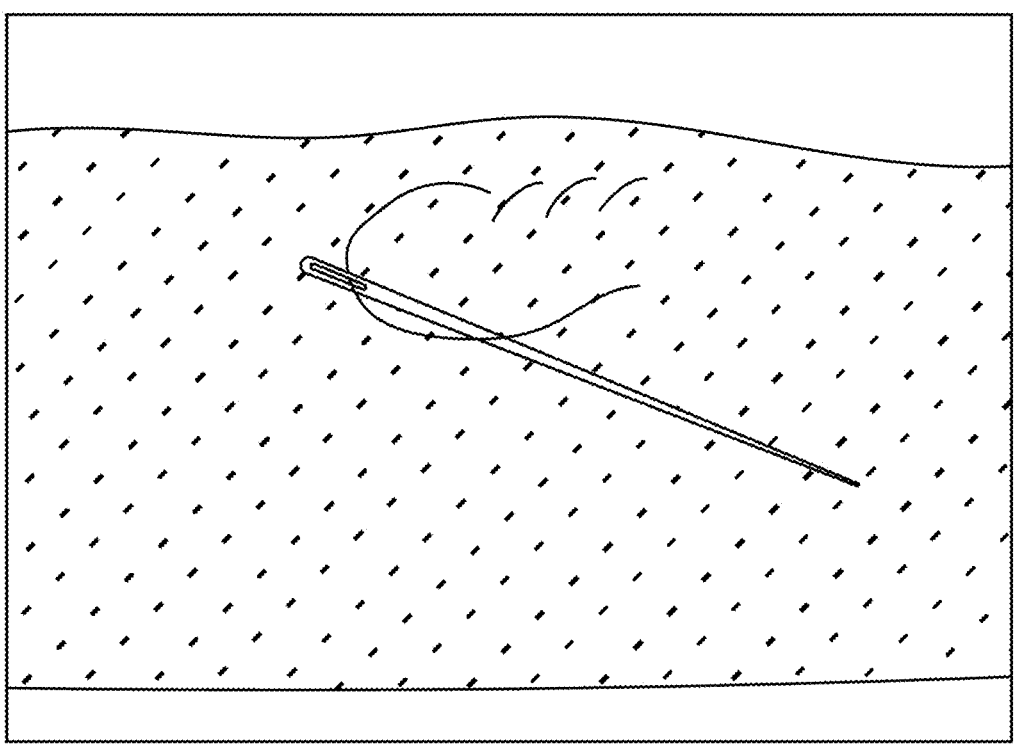
FIG. 3 shows a picture of the contiguous thread prepared by the present method sowing on a cloth.

FIG. 3 shows a picture of the contiguous thread prepared by the present method sowing on a cloth. The thread is pliable to be sowed on a cloth; it is small enough to go through the pore of a needle, it is strong enough to hold together, and it is bendable and not disintegrated into fragments.

The present process produces contiguous threads, and not spun-together fibers. The contiguous thread made by the present invention maintains its original dye color of the recycled cellulose waste, and it does not need to be re-dyed.

Method for Producing Felted Cloth

In a second aspect, the present invention is directed to a method for producing felted cloths from regenerated cellulose-based textile. The method comprises the steps of: (a) grinding cellulose-based textile materials into first fibers having length less than 1 cm, (b) depolymerizing the first fibers in a first acidic solution of pH 1-4 in a pressurized and heated chamber at 50-150° C. and 10-15 psi, (c) removing the acidic solution from the depolymerized fibers and drying the depolymerized fibers, (d) dissolving the dried fibers into an aqueous alkali solution containing 6-20% by weight of an alkali through agitation, at a temperature between −8 to −30° C., to make a cellulose solution, (e) adding the cellulose solution into a bath of a second acidic solution of pH 1-4 to re-polymerize the cellulose into second fibers and mixing the solution in the bath to evenly disperse the second fibers, (f) submerging a mesh with pore size of ≤1 mm into the bath and shaking the mesh until the second fibers are about evenly dispersed around the mesh, and (g) removing the mesh from the bath to capture the fibers on top of the mesh, whereby the captured fibers interlock into felted cloth.

In this method, steps (a)-(d) are similar to those described above in the method for producing threads.

In step (e), the cellulose solution is added into an acidic bath of pH 1-4, preferably, pH 1-3, or pH 2-3, to re-polymerize the cellulose back into fibers. The cellulose to bath ratio is about 1-10 or 1-20 g cellulose/L solution. The re-polymerized fiber solution is mixed thoroughly in the bath to evenly disperse the fibers.

In step (f), a mesh with pore size of ≤1 mm is submerged into the bath, for example with an angle of 30-60° or 40-50° to the bath. The mesh is shaken until the fibers evenly disperse around the mesh.

Figure 4:
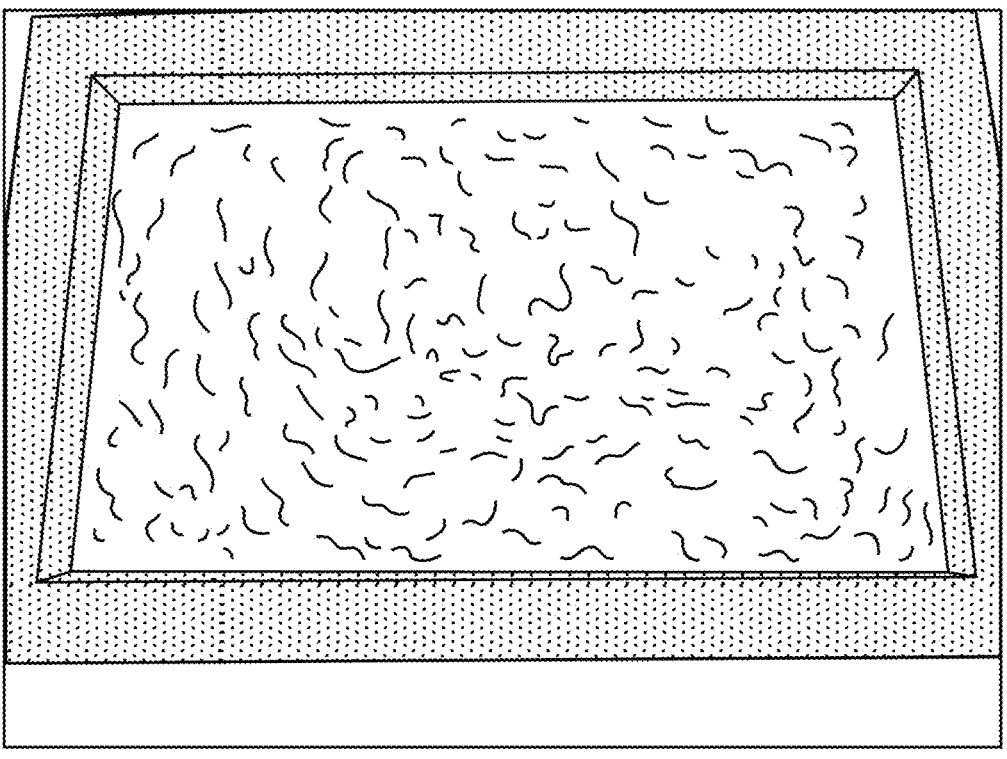
FIG. 4 is a picture showing a piece of a felted cloth formed on top of the mesh.

In step (g), the mesh is then removed from the bath, capturing the fibers on top of the mesh, and the captured fibers interlock with each other to produce one piece of a felted cloth. The felted cloth produced typically has a thickness of up to 1-2 mm in a planar shape. FIG. 4 is a picture showing a piece of a felted cloth made on the top of the mesh.

After step (g), the felted cloth is optionally dried and then treated with a sealant to increase the stiffness and the durability of the cloth.

In one embodiment, the felted cloth is dried on the mesh at room temperature for 6-16 hours. After the felted cloth is removed from the mesh, it is treated with a sealant such as polyvinyl alcohol (PVA) and starch. For example, the cloth is spray-coated with 5-30%, 5-20%, or 10-20% (w/v) of an aqueous sealant solution on one side first, dried at room temperature for 4-8 hours, then spray-coated on the other side, and dried at room temperature for 4-8 hours.

Figure 5:
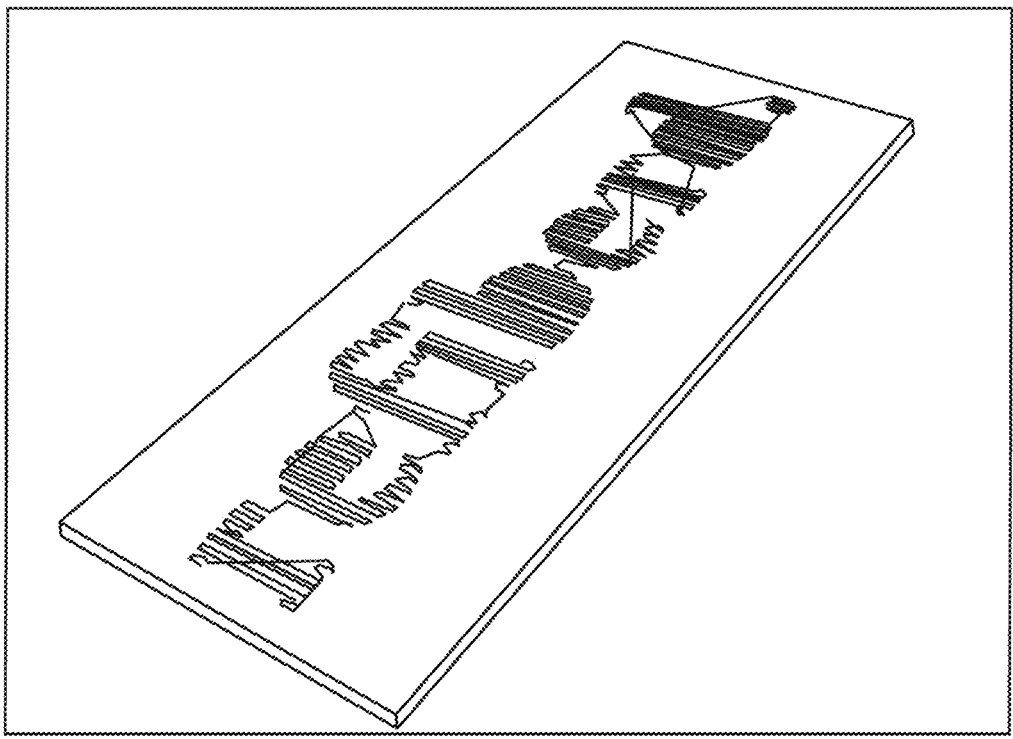
FIG. 5 shows a piece of felted cloth produced by the present method from a recycled cellulose waste. The felted cloth shows its durability by being stitched on without losing its integrity.

FIG. 5 shows a piece of felted cloth produced by the present method from a recycled cellulose waste. The felted cloth was treated with a sealant. The felted cloth shows its durability by being stitched on without losing its integrity.

The felted cloth made by the present invention maintains its original dye color of the recycled cellulose waste, and it does not need to be re-dyed.

The following examples further illustrate the present invention. These examples are intended merely to be illustrative of the present invention and are not to be construed as being limiting.

EXAMPLES

Example 1. Process for Preparing Regenerated
Cellulose-Based Threads from Recycled
Cellulose-Based Textiles Step 1: Cutting & Grinding the Textiles The textiles are cut into pieces that are smaller than 1 cm$^2$, and then the pieces are further ground using an electric grinder that results in fiber segments, which are shorter than 0.5 cm.

Step 2: Depolymerization Treatment

The fiber segments are completely submerged in 0.01 M sulfuric acid (about 200 mL of acid for 5 g of fiber segments).

The acid and fiber solution are kept in a pressurized and heated chamber at a range of 10-12 psi pressure and 110°–115° C. temperature for 4 hours.

After being removed from the pressure chamber, the solution is kept in a warm chamber at 60°–75° C. for 2 hours.

The fiber segments are filtered from the sulfuric acid, rinsed with water, and dried overnight. The sulfuric acid can be reused for subsequent pretreatments indefinitely.

Step 3: Cellulose Dissolution in NaOH/H$_2$O/Urea

A solution of NaOH/water/Urea is prepared with the ratios by weight of 8:80:12 respectively and is kept in a freezer at –18° C. for 4 hours.

Fiber is then dissolved into the cooled solution at a ratio of 5 g of fiber to 100 g solution via a magnetic spinner for 15 minutes. Within the first 5 minutes, the fiber is usually completely dissolved to a gelled cellulose solution, and the next 10 minutes ensure continuity in the solution.

Step 4: Vacuum Degassing

The solution is then poured into the extrusion tank, which is in turn placed into a vacuum chamber. The solution is kept under vacuum and degassed three times repeatedly to remove the air bubbles in the gelled cellulose solution, all at 29 inHg of pressure, with the first interval being 30 minutes long, the second interval being 30 minutes long, and the third interval being 2 minutes long.

Step 5: Extrusion & Thread Production

A syringe needle (ranging from 20-25 gauge) is attached to the bottom of the extrusion tank.

A pump is then used to extrude the solution directly into a vinegar coagulation bath (with a range of 2%-5% acetic acid). The threads stay in the bath for about 5-10 seconds before being removed and rinsed in water.

Example 2. Process for Preparing Regenerated
Felted Cloth from Recycled Cellulose-Based
Textiles Step 1: Cutting & Grinding the Textiles The textiles are cut into pieces that are smaller than 1 cm$^2$, and then the pieces are further ground using an electric grinder that results in fiber segments, which are shorter than 0.5 cm.

Step 2: Depolymerization Treatment

The fiber segments are completely submerged in a 0.01 M sulfuric acid (about 200 mL of acid for 5 g of fiber segments).

The acid and fiber solution are kept in a pressurized and heated chamber at a range of 10-12 psi pressure and 110-115° C. temperature for 4 hours.

After being removed from the pressure chamber, the solution is kept in a warm chamber at 60-75° C. for 2 hours.

The fiber segments are filtered to remove the sulfuric acid, rinsed with water, and dried overnight. The sulfuric acid can be reused for subsequent pretreatments indefinitely.

Step 3: Cellulose Dissolution in NaOH/H$_2$O/Urea

A solution of NaOH/water/urea is prepared with the ratios by weight of 7:12:81 respectively and is kept in a freezer at –20° C. for 4 hours.

Fiber is then dissolved into the cooled solution at a ratio of 5 g to 100 g solution via a magnetic spinner for 15 minutes. Within the first 5 minutes, the fiber is usually completely dissolved, and then the next 10 minutes ensure continuity in the cellulose solution.

Step 4: Mesh Collection

The cellulose solution is emptied into a bath of 0.01 M sulfuric acid (about 1 L of acid for 5 g of fiber segments) and is stirred vigorously with a glass rod, until the re-polymerized fibers are evenly dispersed.

A mesh with a 1 mm pore size is submerged into the bath at a 45 degree angle and the mesh is shaken vigorously by hand, until the cellulosic solution is about evenly dispersed around the mesh. The mesh is then removed from the bath, capturing the fibers on top of the mesh to produce a felted cloth.

Step 5: Sealing & Treatment

The felted cloth is dried on the mesh at room temperature for 12 hours, after which the cloth is removed from the mesh. The cloth is spray-coated on one side by a solution of 10% PVA and is left to dry at room temperature for 6 hours. The cloth is then flipped over and spray-coated on the reverse side by 10% PVA and is left to dry at room temperature for 6 hours.

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude the specification.

What is claimed is:

1. A method for producing a contiguous thread from regenerated cellulose-based textiles, comprising the steps of:

(a) grinding cellulose-based textile materials into first fibers having length less than 1 cm, (b) depolymerizing the first fibers in an acidic solution of pH 1-4 in a pressurized and heated chamber at 50-150° C. and 10-15 psi of chamber pressurization, (c) removing the acidic solution from the depolymerized fibers and drying the depolymerized fibers, (d) dissolving the dried fibers of (c) into an aqueous alkali solution containing 6-20% by weight of an alkali through mechanical agitation, at temperature between −8° C. to −30° C., to make a gelled cellulose solution, (e) degassing the gelled cellulose solution under vacuum to produce a gelled and degassed solution, and (f) extruding the gelled and degassed solution through a membrane having 0.25-1 mm pore size into a second acidic solution of pH 1-4 to polymerize the cellulose into fibers and connecting the fibers into the contiguous thread.

2. The method of claim 1, further comprising a step after (f):

(g) rinsing the thread in water.

3. The method of claim 1, wherein the aqueous alkali solution further comprises urea.

4. The method of claim 3, wherein the aqueous alkali solution comprises 6-10% (w/w) of an alkali and 10-20% (w/w) of urea.

5. The method of claim 4, wherein said alkali is NaOH or KOH.

6. The method of claim 1, wherein the temperature of step (d) is between −17° C. to −30° C.

7. The method of claim 6, wherein the temperature of step (d) is between −17° C. to −20° C.

8. The method of claim 1, wherein the degassing of step (e) is repeated at least 2 times.

* * * * *